Aug. 17, 1965 H. NICHOLLS 3,200,520
EARTH MOVING APPARATUS HAVING MEANS FOR REGULATING
DISCHARGE FROM EARTH CARRYING BOWL
Filed Jan. 15, 1963 3 Sheets-Sheet 1

Harvey Nicholls
INVENTOR.

BY *Clarence A. O'Brien*
and *Harvey B. Jacobson*
Attorneys

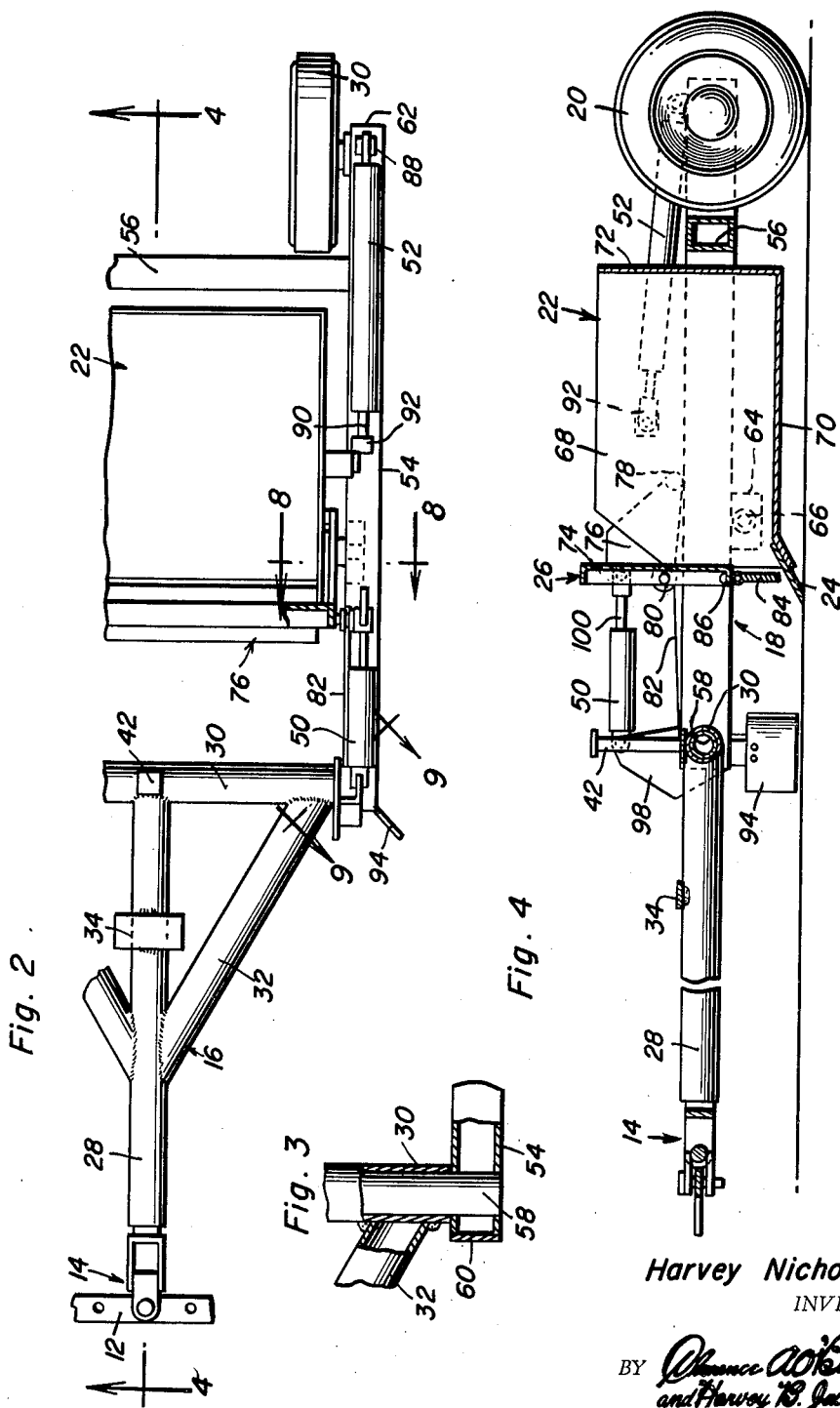

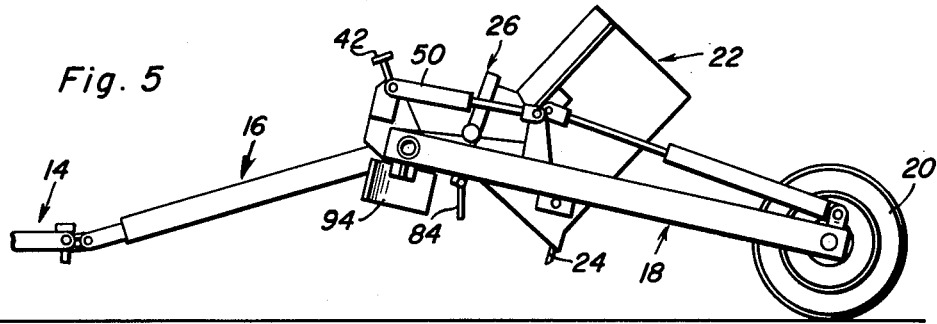
Fig. 5
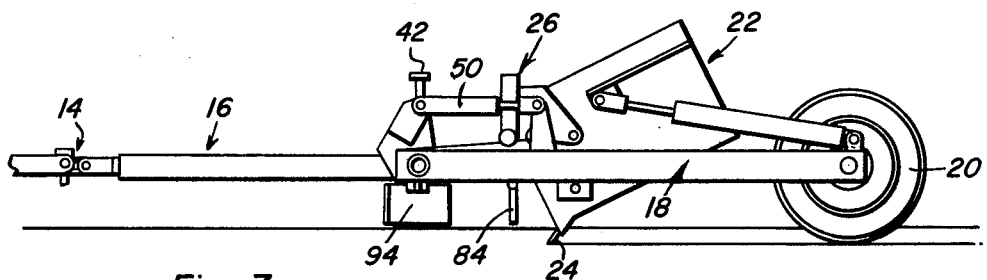
Fig. 6
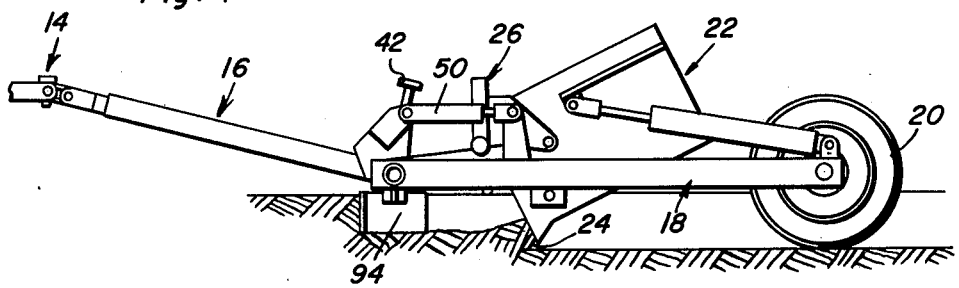
Fig. 7
Fig. 8
Fig. 9
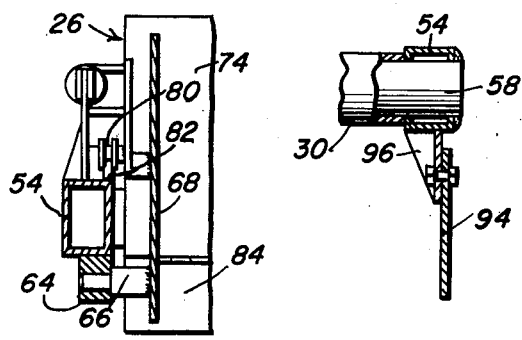
Harvey Nicholls
*INVENTOR.*

United States Patent Office 3,200,520
Patented Aug. 17, 1965

3,200,520
EARTH MOVING APPARATUS HAVING MEANS
FOR REGULATING DISCHARGE FROM EARTH
CARRYING BOWL
Harvey Nicholls, Rte. 2, Warren, Minn.
Filed Jan. 15, 1963, Ser. No. 251,526
7 Claims. (Cl. 37—129)

This invention relates to a new and useful earth moving device of the trailer vehicle type and more particularly to a bucket pulling scraper capable of being effectively controlled for a plurality of different earth moving operations.

It is therefore a primary object of the present invention to provide a trailer vehicle type of earth moving device, the trailer frame of which may be selectively positioned for digging, leveling and dumping operations.

Another important object of the present invention is to provide an earth moving device of the trailer vehicle type in which a towing vehicle is adapted to pull an adjustably positioned bucket on which the scraper blade is mounted in such a relation to the mounting of the bucket on the trailer vehicle as to either load or permit unloading of earth from the bucket for leveling purposes by positioning control of the trailer vehicle frame. The arrangement also permits digging and dumping operations when the trailer vehicle frame and the bucket are cooperatively positioned for such operations.

In accordance with the foregoing objects, the trailer vehicle frame of the present invention is provided with ground supporting wheels at a rear end thereof and is adapted to be hitched to a towing vehicle by a hitching frame at its forward end, at which forward end earth cutting blades are located for lowering into ground engagement for digging purposes or raising out of ground engagement for leveling and dumping purposes. To accordingly position the trailer vehicle frame in order to accomplish the noted earth moving operations, power operated cylinder devices are pivotally mounted on the hitching frame and operatively connected to the trailer vehicle frame for angular displacement of the trailer vehicle frame relative to the hitching frame at the hinge connection therebetween. Positioning of the earth receiving and unloading bucket on the other hand, is accomplished by two-way power operated cylinder devices pivotally mounted at the rear end of the trailer vehicle extending forwardly therefrom for pivotal connection to the bucket in rearward spaced relation above the scraper blade which projects downwardly and forwardly from the bucket. The bucket on the other hand is pivotally mounted by the trailer vehicle frame adjacent the forward end thereof just rearwardly of the scraper blade so that the pull exerted on a trailer frame by the towing vehicle may be effectively transmitted to the scraper blade through the bucket while the bucket may be pivotally positioned in order to control the depth of engagement of the scraper blade as well as to control loading or unloading of earth from the bucket by the power operated cylinder devices which will also be effective to resist the loads imposed on the scraper blade by movement of earth. The bucket is therefore pivotally displaced between a horizontal position relative to the trailer vehicle frame and a substantially vertical position relative thereto. Also, an end gate mechanism is mounted on the bucket and is operatively engageable with a cam track on the trailer vehicle frame for the purpose of regulating unloading of earth from the bucket when the trailer vehicle frame is positioned for leveling operation in order to uniformly spread the earth so unloaded.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a partial top plan view of the apparatus.

FIGURE 3 is an enlarged partial top plan view of a portion of the apparatus with parts broken away and shown in section.

FIGURE 4 is a side sectional view of the apparatus taken substantially through a plane indicated by section line 4—4 on FIGURE 2.

FIGURE 5 is a simplified side elevational view of the apparatus illustrated in an earth dumping position.

FIGURE 6 is a side elevational view similar to FIGURE 5 but illustrating the apparatus in a leveling position.

FIGURE 7 is also a simplified side elevational view of the apparatus in a digging position.

FIGURE 8 is an enlarged partial sectional view taken substantially through a plane indicated by section line 8—8 in FIGURE 2.

FIGURE 9 is an enlarged partial sectional view taken substantially through a plane indicated by section line 9—9 in FIGURE 2.

Figure 1:
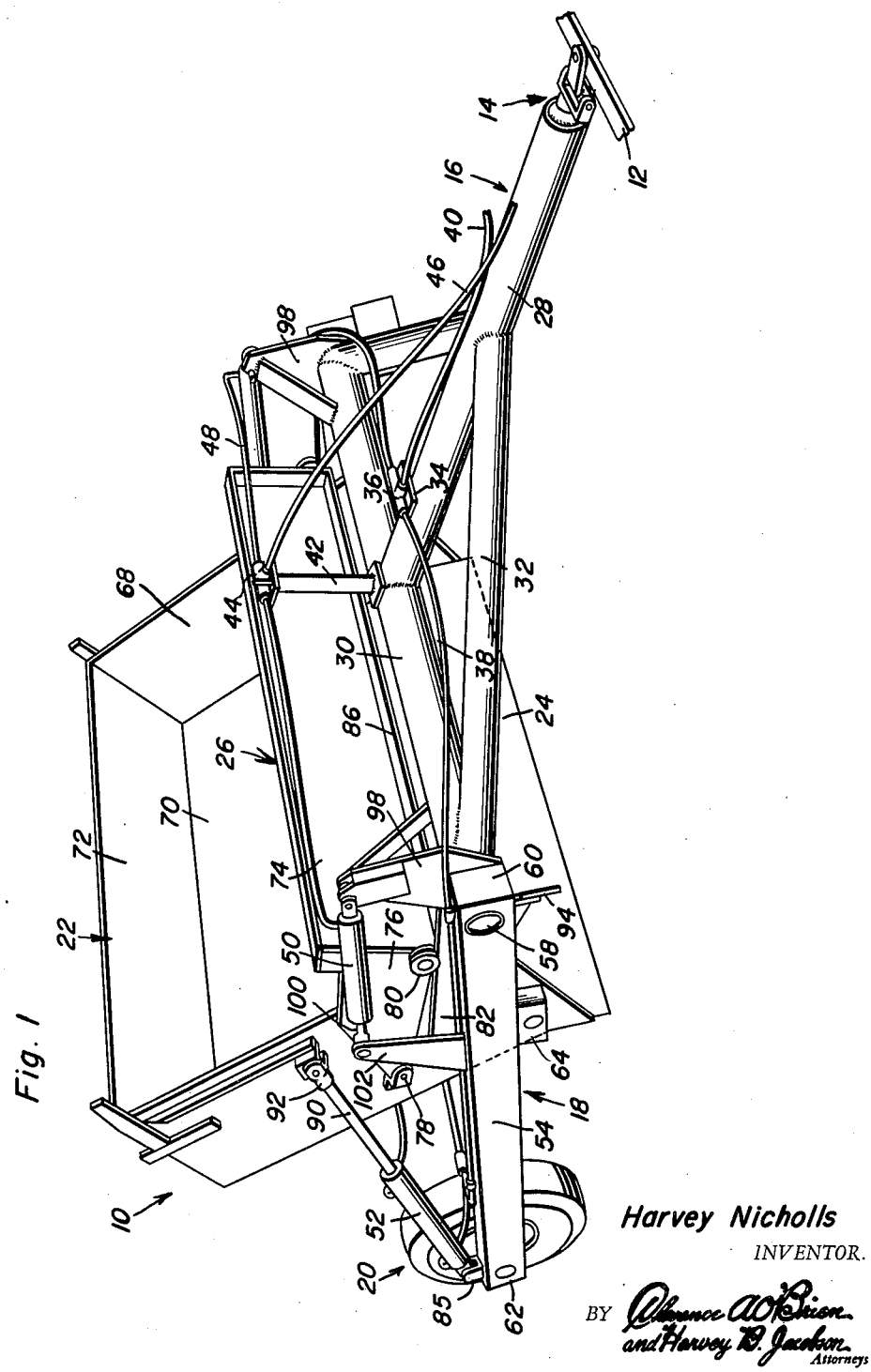
FIGURE 1 is a perspective view of the earth moving apparatus of the present invention.

Referring now to the drawings in detail, it will be observed from FIGURE 1 that the earth moving apparatus generally referred to by reference numeral 10, is adapted to be towed by a towing vehicle such as a farm tractor to which the apparatus is hitched by means of a drawbar 12 which is connected to and projects rearwardly from the tractor towing vehicle. Thus, a universal joint 14 is provided at the forward end of a hitching frame assembly 16 for connection of the apparatus to the towing vehicle drawbar 12. The hitching frame assembly 16 is in turn pivotally connected about a horizontal axis to the forward end of a trailer type of vehicle having a trailer frame assembly generally referred to by reference numeral 18 supported in spaced relation above the ground between the hitching frame assembly and a pair of ground supporting wheel assemblies 20 located at the rear end of the trailer frame assembly. Movably mounted by the trailer frame assembly, is an earth receiving and unloading hopper or bucket 22 having an open forward end from which a scraper blade 24 extends, while a front end gate assembly 26 is mounted on and associated with the bucket assembly 22 for controlling the unloading of earth therefrom as will hereafter be further explained. Control mechanism is also provided for the purpose of adjustably positioning the hopper assembly 22 relative to the trailer vehicle frame and to adjustably position the trailer vehicle frame above the ground in connection with the different earth moving operations.

Referring now to FIGURES 2, 3 and 4 in particular, it will be observed that the hitching frame assembly includes an elongated pulling post member 28 to which the universal joint 14 is connected at the forward end, the rear end of the post member 28 being connected as by welding to a transversely extending tubular journal member 30. A pair of bracing arms 32 interconnect the opposite transverse ends of the tubular journal member 30 to an intermediate portion of the pulling post member 28 so as to form a rigid assembly. A supporting plate 34 is secured to the post member 28 at a convenient position there along, to support a hose fitting 36 as shown in FIGURE 1 by means of which fluid conduits 38 are connected to a fluid pressure supply conduit 40 from a fluid pressure source and under the control of a valve control assembly of any suitable type mounted on the towing vehicle, the fluid controls however in themselves forming no part of the present invention. Also mounted adjacent the intersection of the transverse tubular journal member 30 and the pulling post member 28, is a conduit support 42 by means of which the fitting 44 is supported for connecting the fluid supply conduit 46 to the pressure conduits 48 which extend laterally therefrom. The pressure supply conduits 48 therefore extend to positional control means in the form of cylinder devices 50 located adjacent the forward end of the trailer frame assembly 18 while the pressure supply conduits 38 extend to the rear of the trailer frame assembly for supplying fluid under pressure to the two-way positioning control cylinder devices 52 mounted at the rear end of the trailer frame assembly. The trailer frame assembly 18 therefore consists of a pair of parallel side frame members 54 which are interconnected by a transverse connecting member 56 and by a transverse pivot member 58 welded adjacent the forward end 60 of the side frame members 54 as more clearly seen in FIGURE 3. The pivot member 58 therefore extends through the tubular journal member 30 associated with the hitching frame assembly 16 in order to establish a pivotal connection between the hitching frame assembly and the trailer frame assembly at its forward end. The rear end of the trailer frame assembly is supported in spaced relation above the ground by the supporting wheels 20 rotatably mounted on axles extending through the side frame members 54 adjacent the rear ends 62 thereof. Thus, the trailer frame assembly 18 and the hitching frame 16 form a toggle linkage arrangement with the toggle joint established by the journal member 30 and pivot member 58. Vertically directed forces will therefore be exerted at the axis extending through pivot member 58 in response to both towing by the towing vehicle and operation of the cylinder devices 50. Also secured to each of the side frame members 54 but spaced closer to the forward ends 60 and depending therebelow, are pivot supporting members 64. The pivot supporting members 64 therefore receive pivot pin members 66 which are secured as by welding to the hopper assembly 22 as more clearly seen in FIGURE 8.

The bucket or hopper assembly 22 includes a pair of parallel side walls 68 to which the pivot pin members 66 are secured at a lower forward portion thereof in relatively close spaced adjacency to the scraper blade 24 which is secured to and projects downwardly and forwardly from the bottom wall member 70 which interconnects the side walls 68. Also interconnecting the side walls and the bottom wall, is a rear wall 72 while the forward end of the hopper assembly is open so that earth may be received within and unloaded from the bucket. Mounted adjacent the forward open end is the end gate assembly 26 whereby unloading of earth from the bucket is regulated in order to effect uniform spreading thereof for leveling purposes.

The end gate assembly 26 therefore includes the gate member 74 which is pivotally mounted by the side walls 68 of the hopper by means of a pair of rearwardly projecting portions 76 having pivot pins secured thereto and received within pivot brackets 78 secured to the side walls 68. Rotatably mounted at the lower forward end portion of the pivotal mounting portions 76, are guide rollers 80 engageable on a downwardly inclined cam track 82 secured to the side frame members 54 in order to control the positioning of the end gate member 74 when the hopper 22 is pivotally positioned. As shown in FIGURE 4, when the trailer frame assembly 18 is disposed in a horizontal position and the hopper assembly 22 is also in a horizontal position, the guide rollers 80 will engage the cam track 82 so as to hold the end gate assembly 26 in a substantially vertical position. Pivotal displacement of the bucket assembly while the trailer frame is in its horizontal position, would cause the guide rollers 80 thereof to move downwardly on the cam track 82 so that the end gate assembly 26 will maintain its vertical position despite the angular displacement of the bucket from its horizontal position whereby the end gate assembly may effectively regulate the unloading of earth from the bucket. Accordingly, a flow control member 84 is hingedly connected to the lower edge portion 86 of the gate member 74 and is suspended therefrom so that it may be pivotally displaced rearwardly by earth when the bucket is loading, and hang substantially vertically to regulate unloading of earth from the bucket when the bucket is downwardly inclined by a certain amount for controlled spreading of earth.

In order to control the position of the hopper assembly 22 relative to the trailer frame, the power operated cylinder devices 52 are pivotally mounted adjacent the rear ends of the side frame members by the pivot brackets 88. The cylinder devices 52 extend forwardly from the rear ends 62 and have extensible piston rods 90 which are pivotally connected by elements 92 to the side walls 68 of the hopper assembly 22. It will be observed, that the pivot connection of the power operated cylinder devices 52, to the hopper or bucket 22, is disposed rearwardly of the scraper blade 24 and on the opposite side of the pivotal mounting axis for the bucket extending through the pivot pin members 66. Accordingly, when the bucket is in a horizontal position as illustrated in FIGURE 4 or in a slightly inclined position as illustrated in FIGURES 6 and 7, engagement of the earth by the scraper blade in response to forward movement of the trailer vehicle will tend to impose a counterclockwise moment on the bucket assembly as viewed in FIGURE 4, which would be resisted by the power operated positioning cylinder devices 52. Also, because of the relatively close spacing between the scraper blade 24 and the pivotal mounting axis for the bucket assembly, the forward pull exerted on the trailer frame by the towing vehicle would be transferred in large part to the scraper blade in order to effectively move the earth. The relatively large moment arm between the bucket mounting axis and the pivotal connection of the positioning cylinders 52 thereto, will on the other hand require a smaller resisting force and also facilitate pivotal displacement of the bucket from the horizontal position illustrated in FIGURE 4 to the inclined position as illustrated in FIGURE 6 or the substantially vertical position as illustrated in FIGURE 5. When the trailer frame assembly is disposed in the horizontal position as illustrated in FIGURES 4 and 6, the apparatus will be in condition for leveling and the leveling action may be regulated by a relatively small amount of angular displacement of the trailer frame from its horizontal position so as to increase, decrease or raise the scraper blade out of engagement with the earth. When the trailer frame is held in a substantially horizontal position for leveling purposes, the bucket 22 may be maintained horizontal as illustrated in FIGURE 4 so that earth may be received and held there within as it rearwardly displaces the suspended flow control member 84. If spreading of the earth is desired, controlled unloading of earth from the bucket may be effected by pivotal displacement thereof to a slightly inclined position such as illustrated in FIGURE 6 in which case, the pivotally suspended flow control member 84 will be spaced from the open end of the bucket by an amount regulated by the cam track 82 in order to regulate and control unloading of earth from the bucket. With the trailer frame assembly positioned substantially above the ground at its forward end as illustrated in FIGURE 5 for example, the bucket 22 may be positioned to a substantially vertical position for dumping purposes. On the other hand, the trailer frame assembly may be positioned to the position such as illustrated in FIGURE 7 at a downward incline for digging operations. Positioning of the trailer frame assembly for a digging operation will therefore occur when the downward incline of the frame assembly is sufficient to cause the cutting blades 94 to penetrate the soil. The cutting blades 94 are therefore disposed in a vertical plane at a rearwardly converging angle as more clearly seen in FIGURE 2 when the trailer frame assembly is in a horizontal position. The cutting blades may therefore cooperate with the scraper blade 24 disposed rearwardly thereof to cut and excavate, said blades constitute digging means rendered operative only when the apparatus is conditioned for digging by the operational control means 50. The cutting blades are therefore mounted at the forward ends 60 of the side frame members 54 and depend below the toggle axis through pivot member 58, as more clearly seen in FIGURES 4 and 9. Mounting brackets 96 are therefore secured as by welding to the side frame members 54 to which the cutting blades 94 are connected by any suitable fastener assembly.

In order to adjustably position the trailer frame assembly 18 in connection with the aforementioned earth moving operations, a pair of upwardly projecting mounting brackets 98 are secured to the opposite transverse ends of the tubular journal member 30 associated with the hitching frame assembly, said mounting bracket members 98 pivotally mounting the positioning cylinder devices 50 in vertically spaced relation above cutting blades 94 and the toggle axis through journal member 30. Each of the cylinder devices 50 therefore has associated therewith a piston connected to a piston rod 100 that extends rearwardly therefrom, the piston rods being pivotally connected to the trailer frame assembly, by means of a pair of connecting bracket members 102 which are connected to and extend upwardly from the side frame members 54. It will therefore be apparent, that extension of the piston rods 100 from the cylinder devices 50, will cause angular displacement between the hitching frame assembly 16 and the trailer frame assembly 18 about the pivotal axis extending through the pivot member 58 and the tubular journal member 30 in order to upwardly displace the forward end of the trailer frame assembly toward a position such as illustrated in FIGURE 5. Retraction of the piston and the piston rod 100 within the cylinder device on the other hand, will be effective to downwardly displace the forward end of the trailer frame assembly as illustrated in FIGURE 7. Accordingly, the positioning cylinder devices 50 constitute operational control means whereby the leveling action of the earth moving apparatus may be regulated and whereby the apparatus may be conditioned for dumping as illustrated in FIGURE 5 or for digging as illustrated in FIGURE 7. The pressure supply conduits 48 therefore extend to the cylinder devices 50 for such purpose. The pressure supply conduits 38 on the other hand extend to the two-way power cylinder devices 52 for the purpose of both resisting displacement of the bucket 22 as well as to adjustably position the bucket and the scraper blade 24 fixedly mounted thereon. It will be obvious that pressurization of the cylinder devices may be accomplished with any suitable fluid, this aspect of the apparatus forming no part of the present invention.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. Earth moving apparatus adapted to be towed by a towing vehicle comprising a trailer frame having ground supporting wheel means, hitch means adapted to be pivotally connected to the towing vehicle, means pivotally connecting the trailer frame to the hitch means for support thereof between the hitch means and said wheel means, bucket means movably mounted on the trailer frame for displacement to a plurality of operative positions, scraper means mounted on said bucket means for penetration of earth in response to said displacement of the bucket means to said operative positions, positional control means mounted on the trailer frame and operatively connected to the bucket means for adjustable displacement thereof between loading and unloading positions to variably regulate both displacement of earth by the scraper means and spreading of earth from the bucket means, operational control means operatively connected to the trailer frame and the hitch means at the pivotal connecting means for adjustably positioning the trailer frame above the ground to selectively condition the bucket means and the scraper means for digging, leveling and dumping operations, and digging means connected to the frame and rendered operative during said digging operation to cut the earth, said digging means including cutter blade means mounted on the trailer frame at the pivotal connecting means forwardly spaced from the scraper means to penetrate the earth when the trailer frame is positioned by the operational control means for digging operation, and gate means movably mounted on the bucket means and operatively engageable with the trailer frame for uniformly regulating unloading of and spreading of earth from the bucket means in one of said operative positions when the trailer frame is positioned by the operational control means for leveling operation.

2. The combination of claim 1, wherein said positional control means comprises, power operated means movably mounted on the trailer frame rearwardly of the scraper means for resisting loads imposed thereon by the earth during forward movement of the trailer frame and means connecting the power operated means to the bucket means for pivotal displacement of the scraper means about an axis spaced below the power operated means to vary the depth of penetration thereof.

3. The combination of claim 2, wherein said operational control means comprises, power operated means mounted on the hitch means and connected to the trailer frame for angular displacement of the trailer frame in both directions from a position aligned with the hitch means in a horizontal plane.

4. The combination of claim 3 wherein said bucket means comprises, an elongated hopper pivotally mounted adjacent a forward end thereof by the trailer frame, said hopper having side walls, a bottom wall and a rear wall defining an open forward end, said scraper means being fixed to the bottom wall and projecting forwardly from the open forward end, said gate means being pivotally mounted adjacent said forward open end on the side walls.

5. The combination of claim 4 wherein said gate means comprises, an end gate member pivotally mounted on the bucket means, track means mounted on the trailer frame and engageable with said end gate member for vertical positioning thereof in all positions of the bucket means when the trailer frame is positioned for leveling operation, and a flow control member hingedly connected to the end gate member in suspended relation therebelow.

6. Earth moving apparatus adapted to be towed by a towing vehicle comprising a trailer frame having ground supporting wheel means, hitch means adapted to be pivotally connected to the towing vehicle, means pivotally connecting the trailer frame to the hitch means for support thereof between the hitch means and said wheel means, bucket means movably mounted on the trailer frame for displacement to a plurality of operative positions, scraper means mounted on said bucket means for penetration of earth in response to said displacement of the bucket means to said operative positions, positional control means mounted on the trailer frame and operatively connected to the bucket means for adjustable displacement thereof between loading and unloading positions to variably regulate both displacement of earth by the scraper means and spreading of earth from the bucket means, operational control means operatively connected to the trailer frame and the hitch means at the pivotal connecting means for adjustably positioning the trailer frame above the ground to selectively condition the bucket means and the scraper means for digging, leveling and dumping operations, and digging means connected to the frame and rendered operative during said digging operation to cut the earth, and gate means movably mounted on the bucket means and operatively engageable with the trailer frame for uniformly regulating unloading of and spreading of earth from the bucket means in one of said operative positions when the trailer frame is positioned by the operational control means for leveling operation.

7. The combination of claim 6, wherein said gate means comprises, an end gate member pivotally mounted on the bucket means, track means mounted on the trailer frame and engageable with said end gate member for vertical positioning thereof in all positions of the bucket means when the trailer frame is positioned for leveling operation, and a flow control member hingedly connected to the end gate member in suspended relation therebelow.

References Cited by the Examiner

UNITED STATES PATENTS

| | | | |
|---|---|---|---|
| 1,911,511 | 5/33 | Jordan | 37—129 |
| 1,982,219 | 11/34 | McAlister | 37—129 X |
| 2,112,288 | 3/38 | Heil | 37—124 |
| 2,214,240 | 9/40 | Allin | 37—126 |
| 2,227,450 | 1/41 | Gurries | 37—126 |
| 2,271,631 | 2/42 | Davidson | 37—126 |
| 2,348,910 | 5/44 | Kadz | 37—129 |
| 2,581,073 | 1/52 | Brower | 37—129 |
| 2,993,284 | 7/61 | Miskin | 37—126 |
| 3,073,044 | 1/63 | Bernotas | 37—129 |
| 3,090,139 | 5/63 | Hancock | 37—129 |

FOREIGN PATENTS 567,244  2/45  Great Britain.

BENJAMIN HERSH, *Primary Examiner.*
BENJAMIN BENDETT, *Examiner.*